United States Patent [19]

Wessling et al.

[11] 4,337,185
[45] Jun. 29, 1982

[54] PROCESS FOR MAKING CATIONIC STRUCTURED PARTICLE LATEXES USING REACTIVE POLYMERIC SURFACTANTS

[75] Inventors: Ritchie A. Wessling, Midland; Dale M. Pickelman, Sr., Auburn, both of Mich.

[73] Assignee: The Dow Chemical Company, Midland, Mich.

[21] Appl. No.: 162,289

[22] Filed: Jun. 23, 1980

[51] Int. Cl.$^3$ ............................................. C08L 41/00
[52] U.S. Cl. .................................... 524/458; 525/291; 524/460; 524/815; 523/201
[58] Field of Search ............ 260/29.6 RW, 29.6 WB, 260/29.7 DP, 29.7 W, 29.7 UA, 29.7 UP; 526/203; 525/291

[56] References Cited

U.S. PATENT DOCUMENTS

| | | | |
|---|---|---|---|
| 3,251,790 | 5/1966 | Christenson | 260/29.6 RW |
| 3,363,029 | 1/1968 | Verdol | 260/885 |
| 3,444,151 | 5/1969 | Verdol | 526/203 |
| 3,498,942 | 3/1970 | Dannals | 260/29.6 |
| 3,498,943 | 3/1970 | Dannals | 260/29.6 |
| 3,745,196 | 7/1973 | Lane | 260/29.6 RB |
| 3,880,793 | 4/1975 | Nakayama | 260/29.6 RW |
| 3,959,205 | 5/1976 | Kobayashi | 260/29.6 RW |
| 4,049,604 | 9/1977 | Morehouse | 260/29.6 RW |
| 4,107,120 | 8/1978 | Plamondon | 260/29.6 RB |
| 4,122,052 | 10/1978 | Aihara | 260/29.6 RW |

Primary Examiner—Paul R. Michl
Attorney, Agent, or Firm—I. A. Murphy

[57] ABSTRACT

Structured particle latexes are prepared by emulsion polymerizing monomeric materials in aqueous media in one or more stages wherein in at least one of the stages a reactive polymeric surfactant is used. The resulting latex contains nonionic particles to which are bound the reactive polymeric surfactant which forms a layer containing stabilizing "ionic" groups such as sulfonium groups, quaternary ammonium groups or sulfonate groups chemically bound at or near the surface of the polymer particles, which are dispersed in aqueous media. The cationic latexes are particularly suitable for beater additives and organic pigments.

14 Claims, No Drawings

PROCESS FOR MAKING CATIONIC STRUCTURED PARTICLE LATEXES USING REACTIVE POLYMERIC SURFACTANTS

BACKGROUND OF THE INVENTION (1) Field of the Invention

The invention is concerned with methods for the preparation of structured particle latexes. The polymer particles comprising the latex have stabilizing, pH independent ions which are chemically bound at or near the surface of the particles.

(2) Description of the Prior Art

Latexes require some means for providing colloidal stabilization in aqueous media. The usual colloidal stabilization is provided by surfactants which usually are anionic or cationic but may be nonionic, especially in mixtures with anionic or cationic surfactants. Even though they contribute to the required colloidal stability, the surfactants can interfere with coating performance of the latexes even though the amount is limited and less than the desired stability is obtained. Another method is to copolymerize with nonionic monomers a small proportion of an ionic monomer to prepare a stable latex with little or no conventional surfactant as described in U.S. Pat. No. 3,637,432. Such processes, however, require special combinations of monomers and special polymerization techniques. Although such processes produce latexes having little or no surfactants, varying amounts of water-soluble products are made during carrying out of the process and remain in the product.

Aqueous colloidal dispersions (latexes), stabilized by adsorbed interfacially spreading polyelectrolytes, are described in U.S. Pat. No. 3,965,032. Latexes made by that approach have excellent stability and are particularly useful in application like coatings where conventional surfactants interfere with performance. However, in some cases (e.g., beater addition), the adsorbed polymer layer can be desorbed causing interference with deposition and thereby limiting utility.

Methods of forming structured particle latexes by polymerizing a layer of reactive nonionic copolymer onto the particle surface and then converting, by a subsequent reaction, that layer into a cationic polymer bound to the particle surface are described in U.S. Pat. Nos. 4,056,501 and 4,002,586. In each of these patents, the process requires at least three steps: preparation of the initial latex, capping and post-reaction to form the desired product. Moreover, the products should be freed of the reactive monomers and residual post-reactants before use. In many instances, this step is difficult. For many applications, it would be desirable to have a more economical process.

SUMMARY OF THE INVENTION

This invention involves a process for making a latex having structured particles consisting of a water-insoluble, nonionic, organic polymer core encapsulated with a thin layer of a copolymer having chemically bound, pH independent ionic groups which are at or near the outer surface of the particles. Such latexes may be obtained by the emulsion polymerization of a reactive polymeric surfactant (RPS) either by (a) simultaneous copolymerization with other ethylenically unsaturated monomers which are capable of forming water-insoluble polymers or (b) polymerization of the reactive polymeric surfactant in the presence of a preformed latex stabilized by a low level of bound or adsorbed ions, thus binding the polymer of the reactive polymeric surfactant onto the particle surface. The latexes of either type have structured particles consisting of a water-insoluble, nonionic organic polymer core encapsulated with a layer of a copolymer having pH independent ionic groups chemically bound at or near the outer surface of the structured particle, the amount of said groups being sufficient to provide at least the major portion of the colloidal stability but insufficient to make the polymer water soluble.

DESCRIPTION OF THE PREFERRED EMBODIMENTS

The method for the preparation of the products of this invention requires a reactive polymeric surfactant (RPS). Such surfactants are illustrated in copending application Ser. No. 106,063, filed Dec. 20, 1979, now abandoned, which is a continuation-in-part of application Ser. No. 901,925, filed May 1, 1978, now abandoned, incorporated herein by reference.

The reactive polymeric surfactants are substantially linear, synthetic, water-soluble or water-dispersible organic polymers bearing a plurality of pH independent, randomly distributed ionic groups and at least one water-insensitive reactive functional group which is either in the polymer backbone or pendant therefrom. As used herein, the term "water-insensitive" as applied to the reactive group, means that the reactive group does not interfere with emulsion polymerization or react so rapidly with an aqueous polymerization medium that the group is not available for post-reaction. The reactive functional group provides a cross-linking or grafting site when the reactive polymeric surfactant is adsorbed on a substrate.

A wide variety of functional groups may be employed. Groups that undergo free radical addition or chain transfer reactions are preferred. This group includes ethylenic unsaturation both in the backbone or as pendent groups, and pendent sulfhydryl (—SH) groups. Groups that undergo ionic condensation or coupling reactions in the presence of water can also be employed. Epoxy groups are of this type. The reactive functional group may be part of the hydrophobic unit as, for example, a copolymerized butadiene unit, or it may be a substituent on the ionic group. The reactive group may be in the polymer, as made, or may be added by a subsequent "post-reaction."

By "water-soluble," as applied to the polymer, is meant a polymer which mixes spontaneously with water to form a homogeneous, thermodynamically stable, molecularly dispersed mixture. When such a water-soluble polymer is a surfactant, the polymeric surfactant molecules can migrate through an aqueous phase and adsorb on the surface of a dispersed phase.

Typically, the reactive polymeric surfactant is composed of a mixture of nonionic hydrophobic units and ionic hydrophilic units in chemically combined form. Preferably, the backbone of the reactive polymeric surfactant is formed by the polymerization of ethylenically unsaturated monomers. The nonionic, hydrophobic units suitably are derived from any copolymerizable ethylenically unsaturated monomer which, when in the form of an amorphous homopolymer, would have a solubility in water of less than 0.1 percent. The ionic hydrophilic units suitably are derived from ethylenically unsaturated, positively or negatively charged monomers which, when in the form of an amorphous homopolymer, would be soluble in water and which would remain substantially ionized over a broad pH range such as from 2 to 12. The above-mentioned Ser. No. 106,063 shows a preference for a limitation on the nonionic monomer component used in the preparation of the reactive polymeric surfactant that it should contain no substituent extending more than 10 Angstrom units from a point of ethylenic unsaturation but such limitation is not required in the present application. Further, when the reactive polymeric surfactant is cationic, part of the cationic groups, such as from about 1 to about 5 per molecule, may be substituted with pendant hydrophobic groups of from 8 to 20 carbon atoms.

A wide variety of ionic monomers may be employed including both positively and negatively charged species (e.g., sulfonate, sulfate, quaternary phosphonium groups, quaternary ammonium groups, pyridinium groups, sulfonium groups, isothiouronium groups and the like) to provide the ionic hydrophilic units. These monomers may be defined as being any ethylenically unsaturated ionic monomeric unit (i.e., repeat unit in the polymer chain) which when in the form of a homopolymer is water-soluble. This includes: 2-sulfoethyl methacrylate, sodium vinylsulfonate, 2-hydroxy-3-sulfopropyl methacrylate, 2-acrylamido-2-methylpropanesulfonic acid, sodium styrenesulfonate, vinyl-substituted quaternary ammonium salts (e.g., N,N,N-trimethyl-N-methacryloxyethyl ammonium chloride, N,N,N-trimethyl-N-methacryloxy(2-hydroxypropyl)ammonium chloride and the like), vinylbenzyldialkyl sulfonium salts (e.g., dimethyl vinylbenzylsulfonium chloride) and the like.

Various methods may be used to make interpolymers of nonionic and ionic monomers. Both solution and emulsion processes can be employed. The reaction can be batch, semi-continuous or continuous.

The preferred approach to making the reactive polymeric surfactants of the present invention is to prepare a hydrophobic interpolymer containing nonionic functional units which can be later converted to ionic units and/or reactive functional groups. The hydrophobic polymers are more readily prepared because of the compatibility of the components. Monomers and polymers being of similar polarity normally do not require the presence of a compatibilizing component. Illustrative of reactions which can be carried out on functionally substituted polymers to yield ionic or reactive units are the following: displacement reactions on N,N-dimethylaminoethyl methacrylate units to yield quaternary ammonium groups; esterification of acids, acid chlorides or anhydrides to yield sulfoesters such as the reaction of methylacryloyl chloride units with isothiamic acid to 2-sulfoethyl methacrylate; and the like. Such postreactions also allow the preparation of copolymerized units which cannot be isolated in the monomeric stage or cannot be prepared in water.

The advantages of an emulsion process can be realized by:
(1) polymerizing, in aqueous emulsion, a mixture of ethylenically unsaturated nonionic monomers wherein at least one of the monomers contains a reactive group (other than the polymerizing double bond) which reactive group does not interfere with the emulsion polymerization or react rapidly with the polymerization medium, to obtain an aqueous emulsion of interpolymer particles containing nonionic functional groups; then (2) adding to the emulsion from step (1), a coreactant compound in sufficient amount to convert the functional interpolymer to a water-soluble polyelectrolyte of like charge (i.e., positive or negative charge) to the starting emulsion.

In step (2), the aqueous emulsion of step (1) is converted to an aqueous solution of polyelectrolyte. Any reaction between an added low molecular weight component and the functional groups on the polymer chain that takes place in aqueous media to yield a pH independent site on the polymer chain, can be employed. Exemplary are the class of nucleophilic displacement reactions between a nonionic nucleophile and nonionic alkylating agent to yield an organic cation as illustrated below:

$$RA + Z \longrightarrow RZ^+A^-$$

where Z is a nucleophile, RA is the alkylating agent and A is a leaving group. $RZ^+$ is the derived onium cation and $A^-$ its anion formed from the leaving group. Either reactant can be a substituent on the polymer chain and its counterpart coreactant is selected so as to yield a cationic polymeric product. It is, therefore, possible to make the same cationic product from these two different routes.

Nonionic monomers which form interpolymers with nucleophilic sites include the general classes of tertiary amines, aromatic heterocyclic amines (e.g., pyridines), phosphines and sulfides containing at least one polymerizable double bond as a substituent. Examples include vinyl pyridines, vinylbenzyl dialkylamines, dialkylaminoalkyl acrylates and methacrylates and alkylthioalkyl acrylates and methyacrylates.

Mixtures of interpolymer latexes with the desired alkylating agent are allowed to react at from ambient temperature to about 100° C., or higher if under pressure, to convert the nucleophilic sites to attached onium ions. As the reaction proceeds, the polymer particles become increasingly hydrophilic and eventually dissolve to form an aqueous solution of the RPS. After reaction, the reaction product can be used as is or given other treatments such as stripping to remove unreacted alkylating agents.

The alkylating agents are selected to be highly reactive and volatile and must be at least slightly soluble, e.g., more than 0.001 percent in order to diffuse through the aqueous phase to the latex particles. Preferred alkylating agents include alkyl bromides of 1 to 4 carbons, allyl and methallyl chlorides, benzyl chlorides, and dimethyl sulfate.

Preferentially, the alkylating site may be placed on the polymer chain by using an active halogen-containing comonomer of the classes: vinyl aralkyl halides, haloalkyl butadienes, bromoalkyl acrylate and methacrylates and vinyl bromide. Preferred are vinylbenzyl chloride, chloromethylbutadiene and the bromoalkyl esters. Latexes containing these species in copolymerized form are reacted with carbon-containing nucleophiles which are stable in, and can diffuse through, aqueous media having a hetero atom as the center of nucleophilicity wherein each covalent bond of said hetero atom is to a carbon atom.

The nucleophilic compounds which are used advantageously in the preparation of the reactive polymeric surfactants are represented by the following classes of compounds, sometimes called Lewis bases:

(a) monobasic aromatic nitrogen compounds;
(b) tetra(lower alkyl)thioureas;
(c) $R_1—S—R_2$, wherein $R_1$ and $R_2$ individually are lower alkyl, hydroxy lower alkyl or wherein $R_1$ and $R_2$ are combined as one alkylene radical having 3 to 5 carbon atoms;

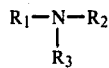
(d)

wherein $R_2$ and $R_3$ individually are lower alkyl or hydroxy lower alkyl, or are combined as one alkylene radical having 3 to 5 carbon atoms and $R_1$ is lower alkyl, aralkyl or aryl except when $R_2$ and $R_3$ together are an alkylene radical then $R_1$ is lower alkyl or hydroxy lower alkyl; and

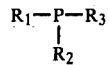
(e)

wherein $R_1$, $R_2$ and $R_3$ individually are lower alkyl, hydroxy lower alkyl or aryl.

In this specification, the term lower alkyl means an alkyl having from 1 to 4 carbon atoms such as methyl, ethyl, propyl, isopropyl, n-butyl and isobutyl.

Representative specific nucleophilic compounds are pyridine, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, N-methylpiperidine, N-ethylpyrrolidine, N-hydroxyethylpyrrolidine, trimethylphosphine, triethylphosphine, tri-n-butylphosphine, triphenylphosphine, trimethylamine, triethylamine, tri-n-propylamine, triisobutylamine, hydroxyethyldimethylamine, butyldimethylamine, trihydroxyethylamine, and N,N,N-dimethylphenethylamine. Use of the nucleophilic component as the reactant is the preferred route because the monomer containing alkylating sites are less likely to interfere with emulsion polymerization and the coreactant nucleophiles are more water-soluble and blend more readily into the latex. They are also easier to remove in a post-reaction cleanup and are less toxic than coreactant alkylating agents.

Another general class of reactions suitable for the present process are the reactions of epoxides with nucleophiles and acids as shown below:

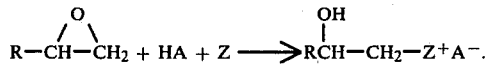

As described earlier, either the epoxide or the nucleophile may be attached to the polymer chain. Epoxide groups can be incorporated into the copolymer by, for example, copolymerization of an unsaturated epoxide such as glycidyl acrylate or methacrylate. Alternatively, the nucleophilic polymers described earlier can be reacted with a lower epoxide such as ethylene oxide, propylene oxide, epichlorohydrin, glycidyl ethers and the like. Suitable acids for either case include HCl, $H_2SO_4$, and lower carboxylic acids, and are typically selected on the basis of the anion desired.

In the preparation of anionic RPS's, anionic emulsion polymerization techniques and conditions are required.

For such processes, conventional anionic soaps and initiators which yield nonionic or anionic end groups are used. Any reaction can be used in step (2) which converts a functional copolymer in aqueous emulsion to a water-soluble anionic polyelectrolyte. For example, an anionic latex of a vinylbenzyl chloride copolymer can be formed and then postreacted with sulfite ion to yield a vinylbenzyl sulfonate anionic polyelectrolyte.

The charge density required to render the interpolymer surface active depends strongly on the polarity of the hydrophobic sequences, e.g., sequences made up of relatively polar units like acrylonitrile require less charge to achieve optimum surface activity in an aqueous dispersion. On the other hand, a polymer containing nonpolar sequences like styrene will require proportionately more ionic or hydrophilic units to achieve the same level of activity. In some cases, it is advantageous to employ small amounts (e.g., usually less than about 15 weight percent and preferably from 0 to about 5 weight percent based upon the weight of the instant reactive polymeric surfactants) of very hydrophilic but not ionic comonomers for control of the surface activity and water solubility of the interpolymeric polyelectrolyte without having to use more of the ionic comonomers. Acrylamide, methacrylamide, hydroxyethyl acrylate and hydroxypropyl acrylate are particularly useful for this purpose. Low concentrations of monomers with weak acid or weak base groups and salts thereof may also be used provided that the pH independence of the RPS is not substantially altered, e.g., a minor amount of a vinyl monomer such as acrylic acid or aminoethyl methacrylate (or the hydrochloride salt thereof) could be included to promote adhesion, etc.

The reactive polymeric surfactants have a number average molecular weight of from about 500 to about 40,000 and a charge density of from about 1 to about 4 milliequivalents per gram. Particularly useful are the reactive polymeric surfactants having a number average molecular weight of from about 500 to about 10,000, preferably less than 7,500, having a charge density of from about 1.8 to about 3.0 milliequivalents per gram and wherein the surfactant molecule contains at least two reactive sites. Where the reactive site is an activated olefinic double bond such as a methacryl or a sulfhydryl group or combinations including the above, a small number is sufficient, e.g., 2–4. These types are particularly suited for use in the capping process described below. Larger numbers of the less reactive sites are required. For example, at least about 8 sites per molecular are needed when the reactive site is an allyl type unsaturated olefin group. With butadiene units, best results are obtained with 20 or more. Reactive polymeric surfactants containing reactive sites derived from the incorporation of from about 33 to about 67 mole percent of butadiene units into the polymer are especially preferred in compositions where low film formation temperatures are desired. Hard reactive polymeric surfactant compositions, such as copolymers with 40 to 75 weight percent of methyl methacrylate and/or styrene, are desirable in plastic pigments.

In one embodiment of the process of the present invention, a mixture of ethylenically unsaturated monomers is emulsion polymerized in the presence of a reactive polymeric surfactant and, optionally, also in the presence of small amounts of another surfactant which is capable of forming seed particles. The preferred classes of surfactants for seed preparation are a nonpolymerizable ionic surfactant (e.g., as described in U.S. Pat. No. 3,965,032 and our copending application Ser. No. 123,321, filed Feb. 21, 1980), an ionic surfactant containing an ethylenically unsaturated group, or a mixture of the above. Preferably, a cationic surfactant contains an ethylenically unsaturated group which copolymerizes with the other monomers. Most preferred products are latexes devoid of conventional, adsorbed, low molecular weight surfactants.

In another embodiment of the process of this invention, ethylenically unsaturated monomers first are emulsion polymerized in the presence of a reactive polymeric surfactant and optionally a polymerizable soap to form a seed latex (i.e., a small particle size latex) having a high charge density. Additional quantities of ethylenically unsaturated monomers are then added and emulsion polymerized to cause the particles of the seed latex to grow in size and to attain the desired charge density.

In order to grow into a structured particle latex, the seed composition must stay at the surface as the particle grows; therefore, it must be substantially uncrosslinked, i.e., must not be a microgel. This effect is accomplished such as by adjusting the initiator and chain transfer agent levels in the seed step and also by selecting the number and kind of reactive sites in the polymeric surfactant. In most cases, especially when polymerizing any highly reactive monomer like a diene or an acrylate, the use of a chain transfer agent is essential. The seed latex can be tested for crosslinking by dissolving it in a water-miscible coupling solvent such as tetrahydrofuran, tetrahydrofuran/alcohol mixtures, tetrahydrofurfuryl alcohol or the various alkoxy alkanols. Uncrosslinked seeds form clear solutions. Crosslinked seeds remain particulate and the resulting solvent mixture is visibly turbid.

In yet another embodiment, ethylenically unsaturated monomers are emulsion polymerized in the presence of a reactive polymeric surfactant and an initial or starting latex. The particles of the starting latex thus are encapsulated with reactive, polymeric surfactants bound at or near the particle surface. The resulting latex comprises an aqueous colloidal dispersion of particles of polymer having pH independent ionic groups chemically bound at or near the particle surface. The latexes are particularly suited for beater additives.

Each of the foregoing embodiments has its advantages. For example, the encapsulation method is preferred when maximum control of the particle size and relatively low charge densities are desired. The seed/growth embodiment is particularly advantageous when very high bound charge densities are desired.

There are many known latexes which may serve as the starting latex to prepare the structured particle latexes of this embodiment and the composition is not narrowly critical. Such starting latexes are prepared by processes well known in the art. The starting latex, or components and methods for making such latex, are selected from the known latex compositions which are substantially devoid of ionic groups and/or ionic surfactants of opposite charge adsorbed or otherwise attached to the polymer particles comprising the latex. Preferably, the latex is slightly cationic, usually from the presence of a small amount of a cationic surfactant. Even more advantageously, the cationic charge is derived from copolymerized ethylenically unsaturated surfactants.

The composition of the polymeric component of the starting latex also does affect certain properties of the final product since it constitutes a major portion of the total mass of the product. Thus, a selection will be made somewhat according to the desired polymeric properties known to be possessed by these prior art materials to supplement the properties which are attributable to the encapsulating component of the invention. Thus, as an illustration but not a limitation, for the predominant portion of the products, a starting latex which is film forming at room temperature will be selected but there are uses for which a non-film forming starting latex would be selected, such as for plastic pigments. Ordinarily, the starting latexes have a particle size of from about 500 Angstroms to about 10,000 Angstroms, preferably from about 800 Angstroms to about 3,000 Angstroms. If the products are to be used in a manner such as to require certain commonly recognized characteristics, for example, low electrolyte concentration, such characteristics will be considered when selecting the starting latex and the ingredients to be used in carrying out subsequent parts of the process. Such selections are within the skill of the art and are not considered inventive aspects of the novel compositions and method herein described.

Typically, the starting latexes are obtained by emulsion polymerization of one or more hydrophobic, ethylenically unsaturated monomers. Such monomers are represented by the same monomers listed below for copolymerization in the presence of reactive polymeric surfactants.

The starting latexes for encapsulation also may consist essentially of polymers which are not prepared readily from monomers by emulsion polymerization, either because no substantial polymerization at a commercially acceptable rate is obtained under usual emulsion polymerization conditions, such as with isobutene or because a particular form of the polymerized monomer is desired, for example, stereospecific polyisoprene, stereospecific polybutadiene and the like. Representative preformed polymers are polymers and copolymers of the monoolefins having from 2 to 20 carbon atoms such as ethylene, propylene, 1-butene, 2-butene, isobutene, pentene, hexene, octene, dodecene, hexadecene, octadecene and especially those monoolefins having up to 8 carbon atoms. Especially common types are the various ethylene/propylene copolymers and their halogenated derivatives.

Illustrative of still other polymers which may be constituents for the starting latex for encapsulation are alkyd resins, block and graft copolymers, e.g., styrene/butadiene graft and block copolymers, epoxy resins such as the reaction products of epichlorohydrin and bisphenol-A, and thermosettable vinyl ester resins, e.g., the reaction products of approximately equimolar amounts of a polyepoxide and an unsaturated monocarboxylic acid such as acrylic acid and methacrylic acid or unsaturated fatty acids such as oleic acid.

Methods for preparing the above-described polymers which are not readily obtained by emulsion polymerization and methods for converting the polymers to latexes are well known and are not a part of this invention.

The hydrophobic, ethlenically unsaturated monomers which may be copolymerized in the presence of the reactive polymeric surfactants may be selected from the known wide variety of nonionic, ethylenically unsaturated monomers which are polymerizable in aqueous emulsion to form a water-insoluble polymer. These monomers are well known in the art and hence are illustrated below only by representative examples. The nonionic ethylenically unsaturated monomers are represented by, but not restricted to, hydrocarbon monomers such as the styrene compounds, e.g., styrene, α-methylstyrene, ar-methylstyrene, ar-ethylstyrene, α,ar-dimethylstyrene, ar,ar-dimethylstyrene and t-butylstyrene; the conjugated dienes, e.g., butadiene and isoprene; the hydrocarbon monomers which are modified to possess nonionic substituents, e.g., hydroxystyrene, methoxystyrene and cyanostyrene; the unsaturated alcohol esters such as vinyl acetate and vinyl propionate; the unsaturated ketones, e.g., vinyl methyl ketone and methyl isopropenyl ketone; the unsaturated ethers, e.g., vinylethyl ether and vinyl methyl ether; and the nonionic derivatives of ethylenically unsaturated carboxylic acids such as acrylic esters, e.g., methyl acrylate, ethyl acrylate, butyl acrylate, hexyl acrylate, 2-ethylhexyl acrylate and lauryl acrylate; methacrylic esters, e.g., methyl methacrylate, ethyl methacrylate; the maleic esters such as dimethyl maleate, diethyl maleate and dibutyl maleate; the fumaric esters, e.g., dimethyl fumarate, diethyl fumarate and dibutyl fumarate, and the itaconic esters, e.g., dimethyl itaconate, diethyl itaconate and dibutyl itaconate; and the nitriles, e.g., acrylonitrile and methacrylonitrile. Also, nonionic monomers which form water-soluble homopolymers, e.g., acrylamide, methacrylamide, hydroxyethyl acrylate and hydroxyethyl methacrylate, may be mixed with a hydrophobic monomer in small amounts up to about 10 percent, based on the amount of hydrophobic monomer. Styrene/butadiene and acrylic compositions are preferred for applications requiring film-forming latexes.

The emulsion polymerization processes referred to in this specification can be carried out by free radical initiated polymerization by batch, continuous or controlled monomer feed processes using known conditions of stirring time and temperature and known kinds of additives such as initiators, surfactants, electrolytes, pH adjusting agents, buffering agents and the like. Of course, it is critical to the method that the reactive polymeric surfactant is used by the process as described above. For high charge density latexes, the presently preferred process is one in which part of the ingredients are loaded initially into the reactor and reacted to form a seed latex, after which the remaining ingredients are fed into the reactor at the desired rates. While the reactive polymeric surfactant may be added batchwise, semicontinuously or continuously to the reaction mixture, it is preferred to add all of the reactive polymeric surfactant and a portion (one-third or less) of the monomers initially to form a very high charge density seen, then add and polymerize the remaining monomers to cause the particles of the seed latex to grow, especially when large particle size latexes are desired.

The initiators used in the emulsion polymerization processes are of the type which produce free radicals and conveniently are peroxygen compounds, for example: the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid—sometimes activated by water-soluble reducing agents such as a ferrous compound, sodium bisulfite or hydroxylamine hydrochloride—and other free radical producing materials such as 2,2'-azobisisobutyronitrile. Hydrogen peroxide, the organic hydroperoxides and azo compounds are preferred for making cationic latexes.

Most conventional chain transfer agents can be used in the process, with alkyl polyhalides and mercaptans being preferred. Examples are bromoform, carbon tetrachloride, carbon tetrabromide, bromoethane, alkyl mercaptans of 1 to 12 carbon atoms, thiophenol and hydroxyalkyl mercaptans. Combinations of hydrogen peroxide with carbon tetrabromide or mercaptoethanol and dodecyl mercaptan with azobisisobutyronitrile are especially preferred.

The conventional cationic nonpolymerizable surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds, isothiouronium compounds and phosphonium compounds. Specific examples of the cationic surfactants are dodecylamine acetate, dodecylamine hydrochloride, tetradecylamine hydrochloride, hexadecylamine acetate, lauryl dimethylamine citrate, octadecylamine sulfate, dodecylamine lactate, cetyl trimethyl ammonium bromide, cetyl pyridinium chloride, an ethanolated alkyl guanidine amine complex, stearyl dimethyl benzyl ammonium chloride, cetyl dimethyl amine oxide, cetyl dimethyl benzyl ammonium chloride, tetradecylpyridinium bromide, diisobutyl phenoxy ethoxy ethyl dimethyl benzyl ammonium chloride, 1-(2-hydroxyethyl)-2-(mixed pentadecyl and heptadecyl)-2-imidazoline, resin amine ethoxylate, oleyl imidazoline, octadecyl ethylmethyl sulfonium methyl sulfate, dodecyl-bis-β-hydroxyethylsulfonium acetate, dodecylbenzyldimethylsulfonium chloride, dodecylbenzyltrimethylphosphonium chloride and S-p-dodecylbenzyl-N-N-N'-N'-tetramethylisothioronium chloride.

Representative types of anionic emulsifiers are the alkyl aryl sulfonates, the alkali metal alkyl sulfates, the sulfonated alkyl esters, the fatty acid soaps and the like. Specific examples of these well known emulsifiers are dodecylbenzene sodium sulfonate, sodium butyl naphthalene sulfonate, sodium lauryl sulfate, disodium dodecyldiphenyl ether disulfonate, n-octadecyl disodium sulfosuccinate and dioctyl sodium sulfosuccinate. Other species of useful anionic emulsifying agents will be known.

Typical nonionic emulsifiers (surfactants) are compounds formed by the reaction of an alkylene oxide, such as ethylene oxide, propylene oxide or butylene oxide with long chain fatty alcohols, long chain fatty acids, alkylated phenols, long chain alkyl mercaptans, long chain alkyl primary amines, for example, cetylamine, the alkylene oxides being reacted in a ratio of such as 5 moles to 20 moles or higher such as up to 50 moles per mole of the coreactant. Similarly effective compounds are monoesters such as the reaction products of a polyethylene glycol with a long chain fatty acid, for example, glycerol monostearate, sorbitan, trioleate and partial and complete esters of long chain carboxylic acids with polyglycol ethers of polyhydric alcohols. By "long chain" in the above description is meant an aliphatic group having from six carbon atoms to 20 or more.

If a surfactant other than a reactive polymeric surfactant is used either in preparing a starting latex for later encapsulation or as an additional surfactant in conjunction with the reactive polymeric surfactant such as to control particle size, it is preferable to use a polymerizable surfactant such as those described, for example, in the following U.S. Pat. Nos.:

2,772,310
3,544,532
3,640,922
3,714,256
3,780,092

Especially preferred are the ethylenically unsaturated fugitive surfactants such as polymerizable cationic surfactants in which the cationic group is sulfonium, sulfoxonium, isothioronium or a reducible nitrogen group, e.g., pyridinium, isoquinolinium and quinolinium.

The polymerizable surfactants copolymerize with the other monomers to form water-insoluble species which remain as part of the polymer particle and thus the latex product is not contaminated with undesirable water-soluble surfactants. When a surfactant is used to prepare a starting or seed latex, the total amount of surfactant required to make the starting or seed latex is determined by the particle size desired but usually is in the range from about 0.1 to about 10 percent, based on the total weight of monomers. When the higher amounts of surfactant are used to make the starting or seed latex, it is essential to use a polymerizable variety or a non-polymerizable polymeric surfactant.

The product obtained by the process of this invention is a latex of which the colloidally dispersed polymer particles, having a particle size of from about 500 Angstroms to about 10,000 Angstroms, consist of the starting latex particles encapsulated with a bound layer having a thickness of from a monomolecular layer of the copolymer to about 100 Angstroms, the layer consisting of an ionic nondesorbable polymer. The ionic polymer is considered nondesorbable if it cannot be removed by simple physical processes such as dialysis.

The ionic latexes of the present invention have considerably improved chemical and mechanical stability when compared with latexes not having chemically bound charges. In many applications, however, such as in coating hydrophobic substrates, latexes stabilized only by charges chemically bound to the particle surface have too high surface tension to provide good wetting of the hydrophobic surface. In such instances, the addition to the latex of small amounts, such as from about 0.01 milliequivalent to about 0.1 milliequivalent per gram of polymer, of conventional ionic or nonionic surfactant is advantageous. In still other applications (such as in wet and addition of latexes to pulp (U.S. Pat. No. 4,178,205)), the presence of even small amounts of water-soluble surface active agents is detrimental. The latexes of the present invention are highly advantageous for such applications. Since a sufficient amount of charge is chemically bonded to the particle surface to provide colloidal stability, exhaustive dialysis or ion exchange can be used to remove water-soluble material from the latex and substitute counter ions, if desired, while retaining ionic functionality and colloidal stability of the latex.

An acetone dilution test is a simple screening test for bound charges in aqueous colloidal dispersions in which the nonionic polymer component is insoluble in acetone. The test is particularly effective for styrene and styrene/butadiene compositions. In this test, 1 gram of the latex being tested at 10 percent solids is diluted with 9 grams of acetone and mixed. A positive test for bound charges results when no coagulum forms according to visual observation. A negative test result is reported when the colloidal dispersion destabilizes to form visible coagulum.

Exhaustive dialysis is a convenient method of characterizing the level of bound charge in a latex. A high fraction of bound charge (defined as the ratio of charge densities before and after dialysis) is indicative of good binding efficiency, which is particularly important in latexes with high levels of total charge. In such systems, low efficiency results in a substantial amount of water-soluble surface active species in the latex. The present process provides latexes with charge retentions of 60 to 100 percent, especially greater than 75 percent and therefore permits the preparation of structured particle latexes having bound charge densities in the range of 0.15 to 0.6 milliequivalent per gram (meq/g) and with low, noninterfering amounts of water-soluble fractions. The latexes are especially useful in making high strength nonwoven fibrous composites as described in U.S. Pat. No. 4,178,205.

A simple test is suitable to screen the latexes for shear stability: a drop of latex is placed in the palm of the hand and rubbed back and forth with a finger. As the latex is sheared, it gradually dries out and forms a film. Unstable latexes coagulate before drying, usually after one to three rubs. Stable latexes can be rubbed more than five cycles before failure. Latexes which tolerate 20 rubs are very stable and can be rubbed to dryness before setting up.

The rub test correlates with a more sophisticated test in which a drop of latex is sheared in a cone and plate viscometer (Rotovisco rotational viscometer). A very stable latex according to the rub test can be sheared for greater than 15 minutes at 194 rpm without coagulation of the latex.

The following examples illustrate ways in which the present invention can be practiced, but should not be construed as limiting the invention. All parts and percentages are by weight unless otherwise expressly indicated. Particle sizes shown are average particle diameters obtained by light scattering measurements, except as indicated.

EXAMPLE 1

Preparation of Reactive Polymeric Surfactant

A latex was prepared by emulsion polymerization according to the recipe of Table I.

TABLE I

| | Active Weight Parts | Total Weight Parts |
|---|---|---|
| Deionized water | | 1400 |
| Polymeric surfactant A (a) | 35 | 250 |
| Dodecylbenzyldimethylsulfonium chloride (b) | 2.5 | 11.4 |
| Hydrogen peroxide (30%) (c) | | 14.8 |
| Ferric chloride hexahydrate (1%) (c) | | 2.5 |
| Methyl methacrylate (d) | 250 | 250 |
| Vinylbenzyl chloride (d) | 250 | 250 |
| Carbon tetrabromide (e) | 21.7 | 21.7 |

(a) A copolymer of 60 mole percent of methyl methacrylate and 40 mole percent of vinylbenzyldimethylsulfonium chloride (14% active).
(b) Low molecular weight surfactant.
(c) Initiator combination.
(d) Monomer.
(e) Chain transfer agent.

The ingredients were stirred for one hour at a temperature of 85° C., then 250 parts of deionized water was added and the resulting product was allowed to cool. The product was a reactive latex (Latex 1-A) having 22.5 percent solids, a low odor and a number average molecular weight of 6,725.

Latex 1-A was converted to the sulfonium derivative by adding 1,250 parts of deionized water, 250 parts of dimethyl sulfide (101.7 parts required) and then heating with stirring for three hours at 50° C. Water and excess dimethyl sulfide (total of 260 parts) were removed by vacuum stripping. The resulting product was a nonreactive, cationic polymeric surfactant (Surfactant 1-B) having 18.1 percent activity based on the total weight of the product. The theoretical charge density was 0.471 milliequivalent of charge per gram of sample. Different portions of Surfactant 1-B were converted to reactive cationic latexes by emulsion polymerization according to the recipe shown in Table II.

TABLE II

|  | LATEX 1-B | | LATEX 1-C | |
| --- | --- | --- | --- | --- |
|  | Mole (%) | Parts | Mole (%) | Parts |
| Deionized water |  | 2974 |  | 2979 |
| Surfactant B (18.1%) |  | 276 |  | 276 |
| Methyl methacrylate | (33) | 326 | (20) | 216 |
| Butadiene | (33) | 177 | (50) | 291 |
| Vinylbenzyl chloride | (33) | 497 | (30) | 493 |
| Carbon tetrabromide |  | 32.4 |  | 35.7 |
| Hydrogen peroxide (30%) |  | 44.3 |  | 48.8 |
| Ferric chloride hexahydrate (1%) |  | 2.95 |  | 3.25 |
| TOTAL WEIGHT |  | 4330 |  | 4343 |
| Polymerization time (hr) |  | 2.3 |  | 4.0 |
| Polymerization temperature (°C.) |  | 85 |  | 85 |
| Percent solids |  | 23.4 |  | 23.4 |
| Particle diameter (A) |  | 2950 |  | 2950 |
| Number average molecular weight (Mn) |  | 9830 |  | 7940 |

Reactive polymeric surfactants were prepared from Latex 1-B and Latex 1-C by converting their respective active groups into sulfonium groups by reaction, with stirring, of materials in the indicated proportions as shown in Table III.

TABLE III

| | Reactive Polymeric Surfactants | |
| --- | --- | --- |
| | RPS-1A | RPS-1B |
| Reactive Latex 1-B, parts | 2000 | — |
| Reactive Latex 1-C, parts | — | 2000 |
| Deionized water | 1000 | 1000 |
| Dimethyl sulfide | 233 | 231 |

After the reaction, water and excess dimethyl sulfide were removed by vacuum stripping. Reactive Polymeric Surfactant RPS-1A, calculated on a materials balance basis, had an activity of 14.2 percent by weight and RPS-1B had an activity of 14.1 percent by weight.

Preparation of Structured Particle Latexes from Reactive Polymeric Surfactants

Latexes according to the invention were prepared from RPS-1A and RPS-1B, respectively, in a batch emulsion polymerization process as summarized in Table IV.

TABLE IV

| | Latex 1D | Latex 1E |
| --- | --- | --- |
| Aqueous Charge | | |
| Dodecylbenzyldimethylsulfonium chloride (a) | 32 | 32 |
| RPS-1A (a) | 104 | |
| RPS-1B (a) | | 104 |
| 2,2'-Azobisisobutyronitrile (a) | 8 | 8 |
| Add deionized water to make weight total | 2400 | 2400 |
| Monomer Charge | | |
| Styrene | 1008 | 1008 |
| Butadiene | 592 | 592 |
| 1-Dodecanethiol (b) | 1.6 | 1.6 |
| Polymerization | | |
| Temperature (°C.) | 70 | 70 |
| Time (hr) | 7 | 6 |
| Latex Properties | | |
| Solids, percent | 38.1 | 39.6 |
| Waste | clean | clean |
| Particle diameter (A) | 3060 | >3060 |

(a) Active basis.
(b) Chain transfer agent.
Latex 1D and Latex 1E were rub stable and had a bound charge of 0.12 ± 0.02 milliequivalent per gram of polymer.

EXAMPLE 2

Preparation of Reactive Polymeric Surfactants

A copolymer of 60 weight percent of methyl methacrylate and 40 weight percent of vinylbenzyl chloride was prepared by solution polymerization in methyl ethyl ketone to provide a copolymer having a number average molecular weight (Mn) of 3,675, a ratio of weight average molecular weight/number average molecular weight (Mw/Mn) of 1.52 and a number average degree of polymerization (DPn) of 31. A nucleophilic displacement reaction was carried out with 0.58 mole of dimethylaminoethanol and 0.42 mole of dimethylaminoethyl methacrylate per mole of vinylbenzyl chloride in the copolymer. The reactive polymeric surfactant thus obtained (RPS-2C) was found to contain an average of 4.0 vinyl groups per chain and the solution contained 0.293 milliequivalent of chloride ion per gram of solution. Based on the chloride ion content, the activity was found to be 14.5 percent.

Preparation of a Polystyrene Latex Having Adsorbed but not Bound Charges (Not an example of the invention)

A polystyrene latex prepared by emulsion polymerization using dodecylbenzyldimethylsulfonium chloride as emulsifier was dialyzed until the milliequivalent of chloride ion per gram of solids was 0.040. The dialyzed latex (Latex 2F) had an average particle diameter of 1,010 Angstroms and contained 17.8 percent solids and 0.25 percent of styrene monomer. To 280.9 grams of Latex 2F (having 2 milliequivalents of adsorbed charge) were added 34.0 grams of RPS-2C (4.93 grams active, containing 10 milliequivalents of charge) and 15.3 grams of deionized water. The resulting mixture was gently stirred and the temperature was maintained at room temperature for 16 hours. The solids content of the latex was reduced to 10 percent by the addition of 219.1 grams of water (now Latex 2G). Latex 2G was rub stable but coagulated in the Bound Charge Test in acetone indicating the absence of bound charge.

Preparation of a Latex According to the Invention

To 250 grams of Latex 2G was added 0.05 gram of 2,2'-azobisisobutyronitrile (initiator) and the resulting mixture was stirred while nitrogen gas was forced over the latex for 20 minutes and then was placed in a heating bath maintained at 75° C. for three hours. After being allowed to cool, the product (Latex 2H) was rub stable, had an average particle size of 1,010 Angstroms and a sample thereof remained colloidally dispersed in dilute acetone according to the Bound Charge Test. The bound charge density, as determined by dialysis, was 0.087 milliequivalent per gram.

EXAMPLE 3

Preparation of a Polymerizable Surfactant

A water-soluble 1:1 adduct was prepared from vinylbenzyl chloride and soyadimethylamine, where soya represents aliphatic components of fatty amines consisting of 20 percent of $C_{16}H_{33}$ radicals derived from palmitic acid, 20 percent of $C_{18}H_{37}$ radicals derived from stearic acid, 30 percent of $C_{18}H_{35}$ radicals derived from oleic acid and 30 percent of $C_{18}H_{33}$ radicals derived from linoleic acid.

Preparation of a Reactive Latex

A reactive latex was prepared according to the recipe of Table V.

TABLE V

|  | Weight Active g | Total Weight g |
| --- | --- | --- |
| Polymerizable Surfactant 3A (23.6% solids) | 70 | 296 |
| Deionized water |  | 2567 |
| 1N Hydrochloric acid (a) |  |  |
| Hydrogen peroxide (30%) |  | 103 |
| Ferric chloride hexahydrate (0.1%) |  | 69 |
| Methyl methacrylate | 304 | 304 |
| Vinylbenzyl chloride | 462 | 462 |
| 2-Mercaptoethanol |  | 35.5 |
| Butadiene | 164 | 164 |
|  | 1000 | 4000 |

(a) amount sufficient to adjust the pH to 3.5.

The materials of Table V were mixed in a 2-gallon, glass-lined Pfaudler reactor at 25° C. for 0.5 hour. The temperature was then raised to 75° C. and the materials were stirred and allowed to react for 1.5 hours. The reactive latex which was obtained (Latex 3-B) had the following properties:

| Solids content | 25 ± 0.5% |
| --- | --- |
| Average particle diameter | 2700 ± 300 Å |
| Number average molecular weight (Mn) | 10000 ± 1000 |

Preparation of a Reactive Polymeric Surfactant (Sulfonium Type)

To 3660 grams of Reactive Latex 3-B at 25 percent solids (915 grams solids) were added 1000 grams of deionized water and 432 grams of liquid containing 713 grams of dimethyl sulfide (2.5 moles for each mole of vinylbenzyl chloride in the latex) and the reaction was allowed to continue, with stirring, for five hours at 50° C. Vacuum stripping removed 387 grams of water and excess dimethyl sulfide. Based upon analysis for chloride ion, the product (RPS-3C) had 0.560 milliequivalent of cationic charge (sulfonium) per gram of solution (20.9% active).

Preparation of a Seed Latex

With 107.1 grams of RPS-3C (22.4 grams of active surfactant providing 60 milliequivalents of charge) were mixed 417.4 grams of deionized water, 4.22 grams of 30 percent hydrogen peroxide, 2.88 grams of 0.1 percent ferric chloride hexahydrate, 77.6 grams of styrene and 3.13 grams of 2-mercaptoethanol. The resulting mixture was stirred, heated to 75° C. and allowed to react for one hour. The produce was a clean latex (Latex 3-D) having 15 percent solids and an average particle diameter of 1,780 Angstroms.

Preparation of a Structured Particle Latex From a Seed Latex

To 333 grams of Latex 3-D (50 grams of solids) was added 50 grams of styrene and the resulting mixture was heated to 75° C. and allowed to react with stirring for 1.5 hours. The product was a clean latex having an average particle diameter of 2,510 Angstroms and a solids content of 26.6 percent. The latex was rub stable, passed the acetone stability test and had a bound charge density in the range of 0.12 to 0.17 milliequivalent per gram.

EXAMPLES 4 AND 5

These examples illustrate the preparation of structured particle latexes by a multistep procedure using a reactive polymeric surfactant, a polymerizable surfactant and other monomers to prepare a seed latex which is then subjected to one or more growth steps which consist of adding monomer and polymerizing in each growth step to produce a latex of larger particle size.

Preparation of a Reactive Polymeric Surfactant

A reactive latex was prepared by emulsion polymerization in a stirred reactor of 154.9 grams of methyl methacrylate, 83.6 grams of butadiene, 236.5 grams of vinylbenzyl chloride and 33.3 grams of a polymerizable surfactant (PS-4) consisting of an equimolar adduct of vinylbenzyl chloride and dodecyldimethylamine (added as 114.3 grams of an aqueous solution at 29.1 percent solids) using 18.5 grams of 2-mercaptoethanol and 42.8 grams of a 30 percent solution of hydrogen peroxide (12.8 grams, active) as catalyst at a polymerization temperature of 73° C. for 5 hours. The reactive latex was converted to a reactive polymeric surfactant (RPS-4A) by adding dimethyl sulfide in an amount 2.5 times (molar basis) calculated on the amount of vinylbenzyl chloride in the reactive latex, heating the resulting mixture for five hours at 50° C. with stirring and removing water and the excess dimethyl sulfide by steam stripping. The reactive polymeric surfactant (RPS-4A) had a number average degree of polymerization of 65, a weight average molecular weight (Mw) of 15,657 and a number average molecular weight (Mn) of 6,731.

Preparation of Structured Particle Latexes Using a Reactive Polymeric Surfactant (RPS-4A)

Examples 4A and 5A were the initially prepared latexes made by emulsion polymerizing the monomers styrene and butyl acrylate using 8.0 percent (active basis) of a polymerizable surfactant (the simple quaternary ammonium adduct of vinylbenzyl chloride and dodecyldimethylamine) and 16.0 percent (active basis) of RPS-4A, the amount shown in Table VI of the respective monomer and 0.5 mole percent of hydrogen peroxide as catalyst in a stirred reactor at a temperature of 75° C. with a reaction time of two hours, except as indicated otherwise, the percentages being calculated on 100 parts by weight of the monomers. Additional data is found in Table VI and Table VII.

Latex 4B was made using Latex 4A as the seed polymer, Latex 4C was made using Latex 4B as the seed polymer and Latex 4D was made using Latex 4C as the seed polymer without further addition of RPS-4A. Latexes 5b, 5C and 5D were made in an analagous manner (see Tables VI and VII for further data). Each of Latex 4A, Latex 4B, Latex 4C, Latex 5A, Latex 5B and Latex 5C can be used for customary latex uses other than as a seed latex for subsequent latex production if the particular particle size is desired for the intended use.

In the preparation of the latexes of Examples 4 and 5, there was insignificant waste in the polymerization reactor. All of the latexes also exhibited excellent rub stability.

TABLE VIII

| Latex 6A | |
|---|---|
| Initial Charge | |
| Deionized water | 2077 |
| Ferric chloride hexahydrate (0.1%) | 50 |
| Con-add Stream No. 1 - Aqueous | |
| Polymerizable Surfactant PS-6 (a) | 407 |
| Hydrochloric acid, 1N | 30 |
| Hydrogen peroxide (30%) | 76 |
| Deionized Water | 427 |
| Con-add Stream No. 2 - (Monomer) | |
| Methyl methacrylate | 630 |
| Vinylbenzyl chloride | 270 |
| 2-Mercaptoethanol (chain transfer agent) | 40 |

(a) PS-6 = an equimolar adduct of vinylbenzyl chloride and n-dodecyldimethylamine at 24.6 percent by weight in water.

TABLE VI

| Latex No. | Monomers Styrene | Butyl Acrylate | Seed Polymer Kind | Amount g (d) | Charge Loaded Meq/g | Solids Loaded % | Solids Measured % | Yield % | pH (e) |
|---|---|---|---|---|---|---|---|---|---|
| 4A | 40 | 60 | (a) | — | 0.66 | 25.0 | 22.8 | 91.2 | 1.56 |
| 4B | 40 | 60 | 4A | 313 | 0.50 | 30.0 | 28.9 | 96.3 | 1.73 |
| 4C | 40 | 60 | 4B | 200 | 0.33 | 33.3 | 33.2 | 99.7 | 1.92 |
| 4D | 40 | 60 | 4C | 100 | 0.165 | 37.0 | 38.0 (b) | 100+ | 2.25 |
| 5A | 60 | 40 | (a) | — | 0.66 | 25.0 | 24.8 | 99.2 | 1.77 |
| 5B | 60 | 40 | 5A | 313 | 0.50 | 30.0 | 29.8 | 99.3 | 1.86 |
| 5C | 60 | 40 | 5B | 200 | 0.33 | 33.3 | 34.4 | 100+ | 2.03 |
| 5D | 60 | 40 | 5C | 100 | 0.165 | 40.0 | 39.6 (c) | 99.0 | 2.38 |

(a) Contains 8.0% by weight of polymerizable surfactant (PS-4) and 16.0% by weight of reactive polymeric surfactant (RPS-4A) but no seed polymer.
(b) Reaction time = 2.2 hours.
(c) Reaction time = 2.3 hours.
(d) Solids basis.
(e) From reactor.

TABLE VII

| Latex No. | (a) Final Solids % | (a) Particle Diameter Angstrom | Onium Concentration Meq/g | (b) Viscosity cps | (c) Surface Tension Dynes/cm | Average Molecular Weight Mw | Average Molecular Weight Mn | (d) Bound Charge % | (e) pH |
|---|---|---|---|---|---|---|---|---|---|
| 4A | 31.0 | 1650 | 0.664 | 70 | 47.8 | 92114 | 23954 | 81.4 | 4.8 |
| 4B | 35.4 | 1700 | 0.459 | 70 | 48.3 | 130325 | 40770 | 84.1 | 5.5 |
| 4C | 32.9 | 1700 | 0.284 | 68 | 51.9 | 217107 | 79516 | 74.1 | 5.8 |
| 4D | 35.0 (f) | 1950 | 0.131 | 128 | 56.0 | 299271 | 89550 | 88.1 | 5.9 |
| 5A | 28.8 | 1950 | 0.609 | 38 | 48.8 | 102092 | 54830 | 84.3 | 5.8 |
| 5B | 28.3 | 2440 | 0.444 | 18 | 51.0 | 140995 | 58280 | 82.9 | 5.8 |
| 5C | 28.3 | 2510 | 0.274 | 30 | 54.3 | 238843 | 71325 | 84.6 | 5.9 |
| 5D | 29.1 | 2560 | 0.123 | 39 | 58.7 | 277776 | 97018 | 81.9 | 6.1 |

(a) Determined after vacuum distillation (IX).
(b) Brookfield at 25° C.
(c) At 10% solids.
(d) Determined using dynamic dialysis (3 days).
(e) Raised by treating with ion exchange resin to remove salts.
(f) 0.8% waste during vacuum distillation.

EXAMPLE 6

A structured particle latex was prepared by the reactive polymeric surfactant process by (1) preparing a reactive latex using a polymerizable surfactant, (2) preparing a reactive polymeric surfactant in the form of an aqueous solution from the reactive latex, (3) preparing a base latex in a seed/growth recipe and (4) capping the base latex with the reactive polymeric surfactant by a two-stream continuous addition process according to the following description.

Reactive Latex

Reactive Latex 6A was prepared according to the recipe in Table VIII.

TABLE IX

| Reactive Polymeric Surfactant RPS-6 | |
|---|---|
| Post-Polymerization Additives | |
| Sodium hydroxide, 1N | 180 |
| Deionized water | 460 |
| Dimethylaminopropyl methacrylamide | 73 |
| Dimethyl sulfide | 121 |

The reaction was carried out in a two-stream con-add process in a 2-gallon Pfaudler kettle. The initial charge was added to the reactor kettle and was purged with nitrogen. The temperature of the contents was raised to about 75° C. and 140 grams from each stream was fed to the reactor. After the resulting exotherm raised the temperature to about 80° C. (about 15 minutes), the balance of each feed stream (800 grams) was fed into the reactor in a continuous manner over a period of 50 minutes. The reactor conditions were maintained for an additional 20 minutes and the reaction mixture was allowed to cool. The product thus obtained was a reactive latex (Latex 6A) having a particle diameter of about 1,500 Angstroms wherein the polymer component had a number average molecular weight (Mn) of 5,900, an average degree of polymerization ($DP_n$) of 49 and an average number of side chain hydrophobes of 1.6 per polymer chain.

Preparation of Reactive Polymeric Surfactant

The post-polymerization additives were added (in the order shown in Table IX) to the reactor which contained Latex 6A. The temperature of the reactor contents was then raised to 50° C. and maintained at that value for four hours, then the reaction mixture was cooled and removed from the reactor. The resulting aqueous solution [Reactive Polymer Surfactant (RPS-6)] had a solids content of 22.6 percent, contained 1.84 milliequivalent of chloride ion per gram of dry solids (=20.9 percent active), degree of polymerization* (DPn) of 49, side chain hydrophobe content of 1.6* per chain and a methacrylamide group content of 2.6* per chain (* all are number average).

| Polymer Chain Composition** | |
|---|---|
| Component** | Mole Fraction |
| Methyl methacrylate | 0.756 |
| Vinylbenzyl sulfonium | 0.159 |
| Vinylbenzyl ammonium (vinyl) | 0.053 |
| Vinylbenzyl ammonium (hydrophobe) | 0.032 |
| | 1.000 |

**in copolymerized form.

Base Latex Preparation (Latex 6B)

A base latex was prepared from a monomer mixture in the proportion of 65 parts of styrene and 35 parts of butadiene with 0.2 part of dodecanethiol chain transfer agent in a seed/growth recipe according to Table X.

TABLE X

| | Total Parts |
|---|---|
| Reactor Charge | |
| Deionized water | 2400 |
| Dodecylbenzyldimethylsulfonium chloride (28.9% active) | 133 (38.4 active) |
| Azobisisobutyronitrile | 5 |
| Seed Shot | |
| Monomer mixture | 640 |
| Conadd | |
| Monomer mixture | 480 |

The aqueous charge was added to a 2-gallon Pfaudler kettle, purged with nitrogen and evacuated to a pressure of about 100 millimeters of mercury at 25° C. The seed shot was pumped in and the temperature was raised to 70° C., then held for 1.5 hours. The remaining monomer (the con-add mixture) was fed at a constant rate over a two-hour period. The reaction was allowed to continue under the same conditions for two hours after the last of the monomer was fed to the reactor. The base latex thus obtained (Latex 6B) contained 0.07 milliequivalent of soap per gram of solids and had a solids content of 32 percent and an average particle diameter of 900 Angstroms.

Preparation of a Structured Particle Latex

Without removing the base latex (Latex 6B) from the reactor, RPS-6 was used in a capping reaction at 70° C. by a two-stream con-add process. The ingredients are listed in Table XI.

TABLE XI

| | Proportions (a) | Total Parts |
|---|---|---|
| Aqueous Stream | | |
| RPS-6 (20.9% active) | | 1440 |
| Organic Stream | | 180 |
| Styrene | 25 | |
| Methyl methacrylate | 60 | |
| Butadiene | 15 | |
| Azobisisobutyronitrile | 0.625 | |

(a) per 100 parts monomer

The aqueous stream and the organic streams were added to the base latex continuously over a two-hour period. The temperature was maintained at 70 °C. for four hours after the last of the streams was complete and then the product was allowed to cool. The product thus obtained was a clean, stable, structured particle latex having an average particle diameter of 1100 Angstroms and a solids content of 29.5 percent. The latex was formulated with 0.5 part of Irganox 1010 (an antioxidant of the hindered phenol type) and vacuum stripped at 70° C. whereby the solids content was increased to 32.0 percent. The thus concentrated latex (Latex 6C) was rub stable, passed the acetone test and had a bound charge density of 0.261 milliequivalent of charge per gram of solids, which indicated 78 percent of charge retention.

Comparative Example

Another portion of the base latex of Example 6 (Latex 6B) was used according to the process of U.S. Pat. No. 4,056,501 to prepare a structured particle latex.

Latex 6B (1,120 parts) was capped with 480 parts of the cap composition according to the kinds and the proportions of materials shown in Table XII.

TABLE XII

| | |
|---|---|
| Monomers | |
| Vinylbenzyl chloride | 25 |
| Methyl methacrylate | 60 |
| Butadiene | 15 |
| Catalyst | |
| Azobisisobutyronitrile | 0.625 |

The cap composition was added over 1.5 hours to the base latex at 70° C. and the temperature was maintained for an additional four hours. After being cooled, the finished latex was neutralized with dilute sodium hydroxide. To the neutralized latex was added a mixture of 8.5 parts of dimethyl sulfide, 1.10 parts of dodecyldimethylamine and 3.06 parts of dimethylaminoethanol. After 1.5 hours, 33.3 parts of 1-butanol was added and the resulting mixture was maintained at 70° C. for an additional 2.5 hours at 70° C. The latex obtained thereby was cooled, filtered and formulated with 0.5 part of Irganox 1010 and then vacuum stripped at 70° C. The thus obtained latex was clean, rub stable, passed the acetone test and had an average particle diameter of 1,050 Angstroms and 0.157 milliequivalent of bound charge per gram of solids (determined by dialysis) with a charge retention of 67 percent.

Latex 6C and the Comparative Latex were essentially equivalent in composition and colloidal properties, but the process of this invention (used with Latex 6C) required much less time and yielded a latex which was easier to strip and was free of unreacted vinylbenzyl chloride.

EXAMPLE 7

A structured particle latex was prepared by the reactive polymeric surfactant process in a manner similar to that of Example 6 (Latex 6C) except that in the preparation of the base latex, a nonpolymerizable polymeric surfactant was used rather than a nonpolymeric surfactant.

Preparation of Non-Polymerizable Polymeric Surfactant NPPS-7

To a latex prepared in the same manner with the same ingredients and the same amounts as Latex 6A and having the same properties was added 600 grams of deionized water and 220 grams of dimethyl sulfide. The temperature of the resulting mixture was raised to 50° C. and maintained at the value for four hours while the mixture was stirred, then the reacted mixture was allowed to cool. The resulting aqueous solution was vacuum stripped to remove excess dimethyl sulfide. The product (NPPS-7) contained 1.85 milliequivalent of chloride ion per gram of polymer or 0.420 milliequivalent of chloride ion per gram of product—which indicates 22.7 percent activity.

Preparation of a Structured Particle Latex

The base latex was prepared from a monomer mixture in the proportion of 65 parts of styrene, 35 parts of butadiene with 0.2 part of dodecanethiol chain transfer agent in a seed/growth recipe devoid of nonpolymeric surfactant according to Table XIII and the accompanying remarks.

TABLE XIII

| Initial Reactor Charge | |
|---|---|
| Aqueous | |
| Deionized water | 1440 |
| Azobisisobutyronitrile | 3.0 |
| Non-polymerizable Polymeric Surfactant NPPS-7 (22.7%) | 153 |
| Monomer | |
| Monomer mixture | 384 |
| Con-Add Stream | |
| Monomer mixture | 288 |
| Capping Reaction | |
| Reactive Polymeric Surfactant RPS-6 (20.9%) | 175 |

The aqueous portion of the initial charge was introduced into a 1-gallon stirred reactor, the system was purged 4 times with nitrogen and evacuated to a pressure of about 100 millimeters of mercury at 25° C. The monomer portion of the initial charge was metered in and the temperature raised to 70° C. and held for 1.5 hours. The con-add mixture (the remaining monomer mixture) was fed into the reactor at a constant rate over a two-hour period to form the base latex (Latex 7B).

To make the structured particle latex (Latex 7C), the capping reaction was carried out on in situ Latex 7B by adding RPS-6 over a 5- to 10-minute period and allowing a polymerization reaction to continue under the same conditions for 3.5 hours. After being allowed to cool, the product was a clean, stable, structured particle latex having an average particle diameter of 1,010 Angstroms and was devoid of free non-polymeric surfactant. The latex was diluted with 250 grams of deionized water and formulated with 0.5 gram of Irganox and vacuum stripped at 60° C., thus removing 250 grams of water. The stripped latex contained 30.1 percent of solids, was rub stable, passed the acetone test and had a bound charge density of 0.122 milliequivalent per gram of solid (indicating 72 percent of charge retention).

What is claimed is:

1. In a process for preparing a latex by free radical catalyzed emulsion polymerization in an aqueous medium in at least one stage, the improvement of introducing a reactive polymeric surfactant in at least one stage of the polymerization process to prepare a structured particle latex; said reactive polymeric surfactant being a substantially linear synthetic water-soluble surfactant whose polymeric backbone is derived from the polymerization of one or more ethylenically unsaturated monomers and which polymeric surfactant has a number average molecular weight of from about 500 to about 40,000 and bears, per gram of such reactive polymeric surfactant, from about 1 to about 4 milliequivalents of pH independent randomly distributed ionic groups and, per polymeric surfactant molecule, and average of at least one water-insensitive reactive fractional group selected from the group consisting of ethylenically unsaturated groups, sulfhydryl groups and epoxy groups; said ethylenically unsaturated monomers being (a) one or more hydrophobic monomers or (b) one or more hydrophobic monomers together with at least one hydrophilic nonionic monomer or ionic monomer or mixtures thereof in such proportions that the amount of the hydrophilic nonionic monomer is less than about 15 percent by weight, based on the weight of the reactive polymeric surfactant; said functional group being either in the polymer backbone or pendant therefrom and providing a crosslinking or grafting site; and said structural particle latex having structured particles consisting of a water-insoluble, non-ionic organic polymer core encapsulated with a layer of a copolymer having pH independent ionic groups chemically bound at or near the outer surface of the structured particle; the amount of said ionic groups being sufficient to provide at least a major portion of the colloidal stability but insufficient to make the polymer water-soluble.

2. The process of claim 1 in which a polymerizable surfactant is used.

3. The process of claim 1 in which the reactive polymeric surfactant is mixed with a preformed latex and polymerized.

4. The process of claim 1 in which the process is carried out in at least two stages wherein one stage is the preparation of a seed latex using a reactive polymeric surfactant and the other stage or stages includes the addition of further monomer and emulsion polymerization thereof.

5. The process of claim 1, claim 3 and claim 4 in which the amount of reactive polymeric surfactant is selected to provide a structured particle latex having a bound charge density of from about 0.15 milliequivalent to about 0.6 milliequivalent per gram of polymer in the latex.

6. The process of claim 1, claim 3 and claim 4 in which the predominant amount by weight of polymerized monomers consists of styrene or styrene and butadiene.

7. The process of claim 1 in which the reactive polymeric surfactant has a reactive functional group which comprises an olefinic double bond.

8. The process of claim 7 in which the double bond is derived from butadiene.

9. The process of claim 7 in which the double bond is an activated olefinic double bond.

10. The process of claim 9 in which the reactive functional group is methacryl.

11. The process of claim 1 in which the reactive polymeric surfactant is cationic.

12. The process of claim 1 in which a nonpolymerizable polymeric substance is used in preparing a seed latex.

13. The process of claim 1 in which the reactive polymeric surfactant has ionic groups which are predominantly sulfonium.

14. The process of claim 1 in which the charge density of the reactive polymeric surfactant is from about 1.8 to about 3.0 milliequivalents per gram.

* * * * *